US011644008B1

(12) United States Patent
Saeed

(10) Patent No.: US 11,644,008 B1
(45) Date of Patent: May 9, 2023

(54) VERTICAL AXIS WIND TURBINE HAVING VERTICAL ROTOR APPARATUS

(71) Applicant: Imam Abdulrahman Bin Faisal University, Dammam (SA)

(72) Inventor: Farooq Saeed, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 0 days.

(21) Appl. No.: 17/965,863

(22) Filed: Oct. 14, 2022

Related U.S. Application Data

(63) Continuation of application No. 17/557,187, filed on Dec. 21, 2021, now Pat. No. 11,486,354, which is a continuation of application No. 17/156,772, filed on Jan. 25, 2021, now Pat. No. 11,236,725, which is a continuation of application No. 16/364,790, filed on Mar. 26, 2019, now Pat. No. 10,927,810.

(51) Int. Cl.
*F03D 3/06* (2006.01)
*F03D 3/00* (2006.01)
*F03D 7/06* (2006.01)

(52) U.S. Cl.
CPC ............. *F03D 3/068* (2013.01); *F03D 3/005* (2013.01); *F03D 7/06* (2013.01); *F05B 2200/261* (2013.01); *F05B 2240/214* (2013.01); *F05B 2260/507* (2013.01); *F05B 2260/72* (2013.01); *F05B 2260/76* (2013.01); *F05B 2270/321* (2013.01); *F05B 2270/328* (2013.01); *F05B 2270/329* (2013.01); *F05B 2270/809* (2013.01)

(58) Field of Classification Search
CPC ............ F03D 3/068; F03D 3/005; F03D 7/06; F05B 2240/214; F05B 2260/507; F05B 2260/72; F05B 2260/76
See application file for complete search history.

(56) References Cited

U.S. PATENT DOCUMENTS 6,394,745 B1   5/2002   Quraeshi
6,974,309 B2   12/2005  Seki
(Continued)

FOREIGN PATENT DOCUMENTS

JP         5498775 B2        5/2014
WO    WO 2017/168359 A1    10/2017

OTHER PUBLICATIONS

Hangar51. My Ahaa! Project. Fieldlines.com: The Otherpower discussion Board. Jul. 27, 2006 [online] https://www.fieldlines.com/index.php?topic=139353.0 (Year: 2006).*

(Continued)

*Primary Examiner* — Topaz L. Elliott
(74) *Attorney, Agent, or Firm* — Oblon, McClelland, Maier & Neustadt, L.L.P.

(57) ABSTRACT

In a vertical rotor apparatus that rotates in response to a moving fluid, a shaft defines an axis of rotor rotation. Rotor blades are longitudinally aligned in parallel with the shaft and each rotor blade defines an axis of blade rotation. A sensor generates a signal when any of the rotor blades are within rotor azimuthal angles of blade stall regions. A controller generates blade pitch information for the blade stall regions and an actuator, which is mechanically coupled to each of the rotor blades, alters blade pitch about the axis of blade rotation in accordance with the blade pitch information.

8 Claims, 17 Drawing Sheets

(56) References Cited

U.S. PATENT DOCUMENTS

| | | | |
|---|---|---|---|
| 7,918,646 | B2 | 4/2011 | Akcasu |
| 7,993,096 | B2 | 8/2011 | Anderson |
| 8,193,657 | B2 | 6/2012 | Paluszek et al. |
| 8,410,622 | B1 | 4/2013 | Wallach |
| 10,208,734 | B2 | 2/2019 | Boschitsch |
| 2008/0247872 | A1 | 10/2008 | Akcasu |
| 2011/0006526 | A1 | 1/2011 | Hemmingsson |
| 2016/0230742 | A1 | 8/2016 | Rao |
| 2019/0323480 | A1 | 10/2019 | Rohden |
| 2020/0132044 | A1 | 4/2020 | Chung |

OTHER PUBLICATIONS

Apelfrojd, et al.; A Review of Research on Large Scale Modern Vertical Axis Wind Turbines at Uppsala University; Energies vol. 9, Issue 7 ; Jul. 21, 2016; 27 Pages.

Saeed, et al.; A Straight-Bladed Variable-Pitch VAWT Concept for Improved Power Generation; 2003; 9 Pages.

Hangar51 (My Ahaa! project, auto pitch VAWT. Fieldlines Discussion Board. Jul. 27, 2006. https://www.fieldlines.com/index.php?topic=139353.0 (Year: 2006).

Hwang. "Efficiency Improvement of a New Vertical Axis Wind Turbine by Individual Active Control of Blade Motion" Smart Structures and Materials 2006: Smart Structures and Integrated Systems, vol. 6173 of Proceedings of SPIE, pp. 316-323, San Diego, Calif, USA, Mar. 2006. (Year: 2006).

Paraschivoiu, I. H-Darrieus Wind Turbine with Blade Pitch Control. International Journal of Rotating Machinery, 2009. https://doi.org/10.1155/2009/505343 (Year: 2009).

Aggarwal. Optimization of vertical axis wind turbine on individual blade pitch control. JCPS vol. 9 Issue 4. 2016. (Year: 2016).

Leblanc. "Overview and Design of Pitch VAWT: Vertical Axis Wind Turbine with Active Variable Pitch for Experimental and Numerical Comparison" 2018 Wind Energy Symposium. https://doi.org/10.2514/6.2018-1243. Jan. 7, 2018. (Year: 2018).

Zhao. Variable Pitch Approach for Performance Improving of Straight-Bladed VAWT at Rated Tip Speed Ratio. Applied Sciences. Jun. 11, 2018. http://dx.doi.org/10.3390/app8060957 (Year: 2018).

Sang. "Load and Power Control of Horizontal Axis Wind Turbines." Doctorate Thesis. Mie University, Japan. Mar. 2018. (Year: 2018).

* cited by examiner

VERTICAL AXIS WIND TURBINE HAVING VERTICAL ROTOR APPARATUS

CROSS-REFERENCE TO RELATED APPLICATIONS

The present application is a Continuation of U.S. application Ser. No. 17/557,187, now allowed, having a filing date of Dec. 21, 2021 which is a Continuation of U.S. application Ser. No. 17/156,772, now U.S. Pat. No. 11,236,725, having a filing date of Jan. 25, 2021 which is a Continuation of U.S. application Ser. No. 16/364,790, now U.S. Pat. No. 10,927,810, having a filing date of Mar. 26, 2019.

STATEMENT REGARDING PRIOR DISCLOSURE BY THE INVENTORS

Aspects of this technology are described in "A Straight-Bladed Variable-Pitch VAWT Concept for Improved Power Generation," by Yann Staelens, et al., AIAA Paper 2003-0524, AIAA (American Institute of Aeronautics and Astronautics), Jan. 7, 2003, incorporated herein by reference.

BACKGROUND

Field of the Invention

The invention described herein is related to vertical axis rotors that rotate under influence of a moving fluid, such as wind or water. More specifically, this disclosure relates to vertical axis rotors of vertical axis wind turbines.

Discussion of the Related Art

As the debate regarding the benefits and shortcomings of converting fossil fuels into other forms of energy continues, much research and development has been devoted towards alternative energy conversion techniques. Converting energy from a moving fluid such as wind or water is one such technique. The wind turbine, whether it be a horizontal axis wind turbine (HAWT) or a vertical axis wind turbine (VAWT) offers a practical way to convert wind energy into other forms of energy.

A VAWT is a type of wind turbine where the main rotor shaft is set vertically transverse to the wind direction. One main advantage of the VAWT is in its omnidirectional character, i.e., a VAWT does not need to be pointed into the wind. The omnidirectional character, therefore, eliminates the need for orientation mechanisms that position the turbine based on wind direction, such as those required for HAWTs.

FIG. 1 illustrates an example of a rotor assembly 100 of a conventional straight-bladed VAWT. The primary components of rotor assembly 100 are turbine shaft 110 to transfer mechanical energy from the rotor to a device that can do work (generator, pump, etc.). Rotor assembly 100 further includes rotor blades 130a and 130b, representatively referred to herein as rotor blade(s) 130, to capture the wind energy and struts 120a-120d, representatively referred to herein as strut(s) 120, to attach rotor blades 130 to turbine shaft 110. In the example illustrated, the pitch of rotor blades 130 is fixed and the blades cannot rotate or twist freely about their attachment points. As these blades revolve about the turbine rotor axis under the influence of the aerodynamic forces, they undergo a cyclic variation of pitch angle (angle of attack), defined as the relative angle between the rotor blade's tangential velocity vector and the wind direction vector. The magnitude of this cyclic pitch variation is a direct function of the turbine rpm and the wind speed. One artifact of this cyclic variation is that, at some point in the cycle when the pitch angle is at a critical angle, rotor blades 130 exhibit stall. The stall manifests itself as diminished rotor power compared to that achievable when blade stall is not encountered.

Accordingly it is an object of the invention to provide a vertical axis wind/water turbine rotor that improves power generation by avoiding rotor blade stall.

SUMMARY

In a vertical rotor apparatus that rotates in response to a moving fluid, a shaft defines an axis of rotor rotation. Rotor blades are longitudinally aligned in parallel with the shaft and each rotor blade defines an axis of blade rotation. A sensor determines whether any of the rotor blades are within rotor azimuthal angles of blade stall regions. A controller provides blade pitch information for the blade stall regions and an actuator, which is mechanically coupled to each of the rotor blades, alters blade pitch about the axis of blade rotation in accordance with the blade pitch information.

In one aspect, the sensor comprises a fluid vane mechanically coupled to an uneven swashplate having an incline formed thereon that provides the blade pitch information as a function of fluid flow direction.

In another aspect, the actuator comprises an even swashplate mechanically coupled to the uneven swashplate through a plurality of input rods and mechanically coupled to the rotor blades through a plurality of blade pitch link rods that impart a force on the rotor blades in accordance with spatial orientation of the incline formed on the uneven swashplate.

In another aspect, the sensor comprises a fluid vane configured to indicate fluid direction. Contact wires of the sensor are connected to the fluid vane and displaced with rotation thereof, where the contact wires define the blade stall regions as a function of fluid direction. A contact sensor mounted proximally to the shaft and moving through azimuthal angles therewith generates the signal in response to contacting the contact wires.

In yet another aspect, a plurality of struts mechanically connect the rotor blades to the shaft and the contact sensor is mounted on the struts.

In another aspect, the actuator is mounted on the struts.

In another aspect, the sensor comprises a rotary encoder.

In yet another aspect, a photovoltaic power source provides power to the rotary encoder.

In another aspect, the blade pitch information includes a blade pitch profile that defines a pitch angle as a function of azimuthal angle of rotor rotation In another aspect, the blade pitch profile is constant at a predetermined blade pitch for all azimuthal angles.

In yet another aspect, the blade pitch profile is constant at a predetermined blade pitch for azimuthal angles corresponding to the blade stall regions.

In another aspect, the blade pitch profile is a sinusoid.

In still another aspect, the actuator is internal to each of the rotor blades and rotates the corresponding blade about the axis of blade rotation.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
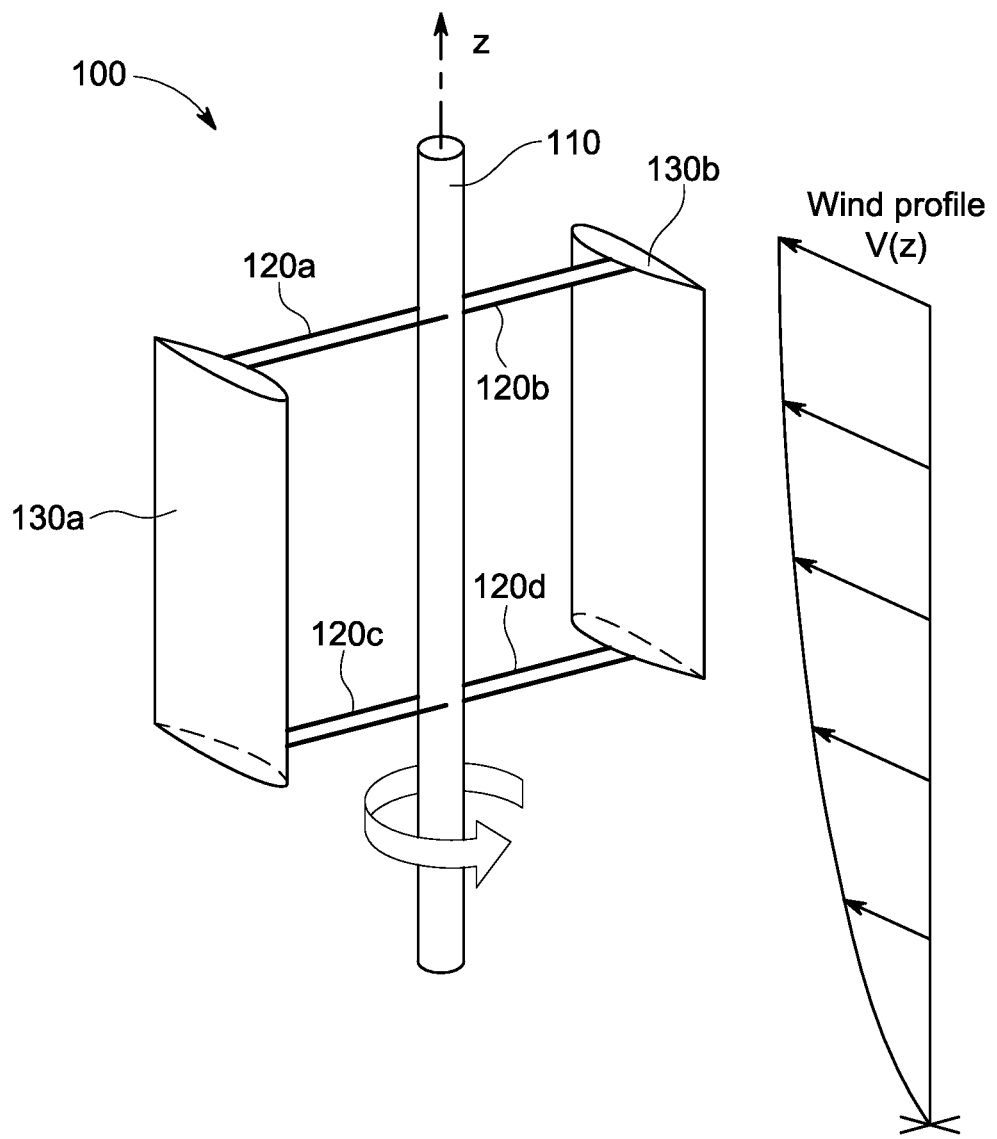
FIG. 1 is a diagram of a conventional vertical axis wind turbine.

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments. Particular quality or fitness of the examples indicated herein as exemplary is neither intended nor should be inferred.

Figure 2A:
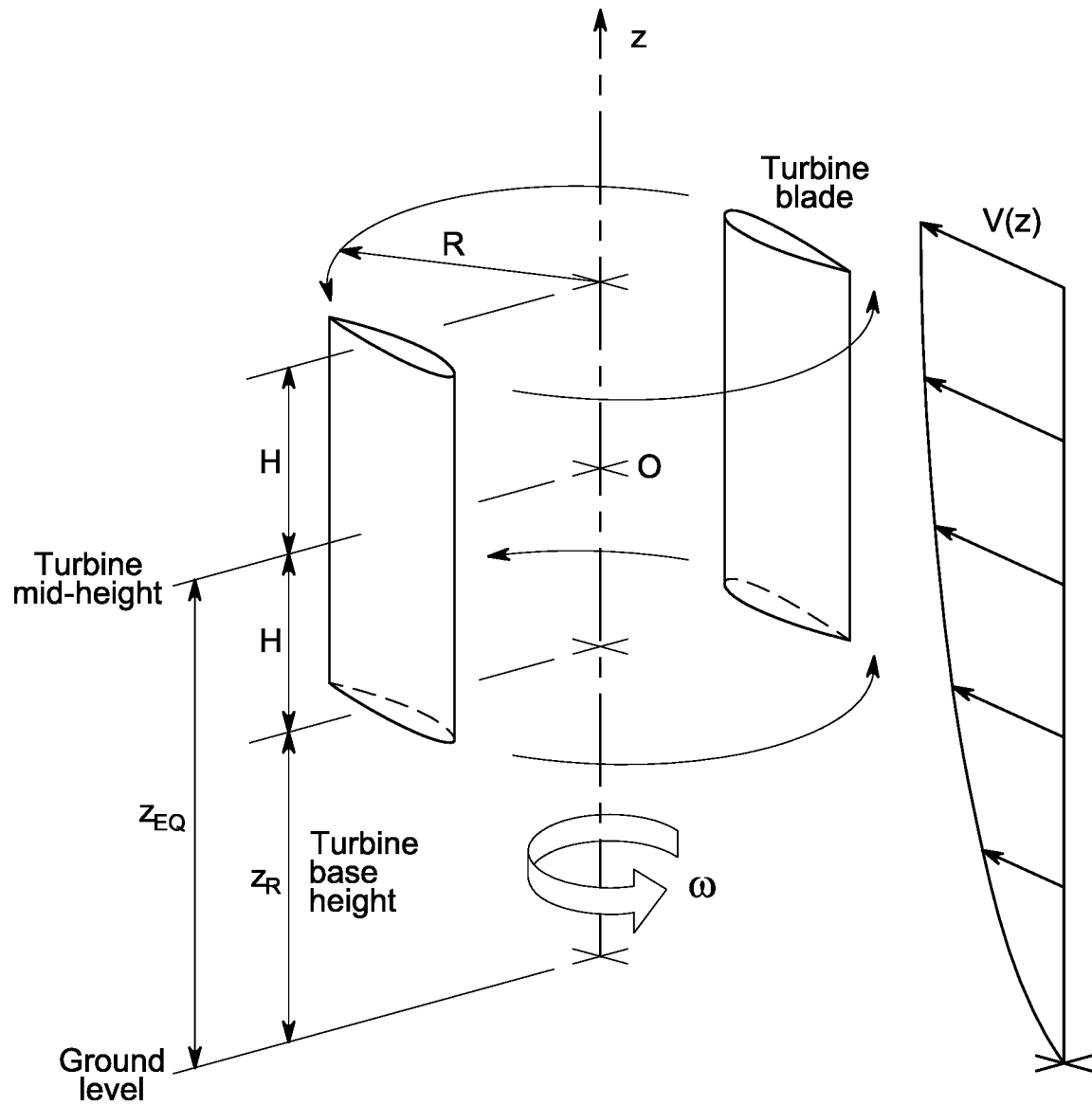
FIGS. 2A and 2B are schematic diagrams of a vertical axis wind turbine for defining parameters of embodiments of the present invention.

FIG. 2A is a schematic diagram of an example VAWT rotor for purposes of indicating certain parameters that are discussed herein. In the example illustrated, space is defined in cylindrical coordinates by a triplet $(r, \theta, z)$, where r is the distance from a chosen reference axis (radius), $\theta$ is a direction from the chosen reference axis relative to a chosen reference direction (azimuthal angle), and z is the distance from a chosen reference plane perpendicular to the chosen reference axis (height). In this disclosure, the reference axis is the axis of rotation of the rotor that coincides with the z-axis and the reference plane is at $z=z_{EQ}$, i.e., the equatorial plane of the rotor. Two rotor blades are situated at $(R, 0, z_R)$ and $(R, \pi, z_R)$, where, as illustrated in FIG. 2A, $z_R$ is the distance from the lowest point on the rotor blades to a reference ground where the wind speed V(z) is at a minimum. Each rotor blade is 2H in longitudinal length. In certain embodiments, the rotor blades are matching National Advisory Committee for Aeronautics (NACA) airfoils, e.g., NACA 0015 airfoils, and are fixed in space relative to the rotor axis by a mechanical connection, such as by a strut or similar mechanism (not illustrated in FIG. 2A) connected to a shaft or similar mechanism (not illustrated in FIG. 2A) situated on the rotor axis. It is assumed that the blades revolve about the z-axis at an angular velocity $\omega$ under aerodynamic forces imparted by the wind.

Figure 2B:
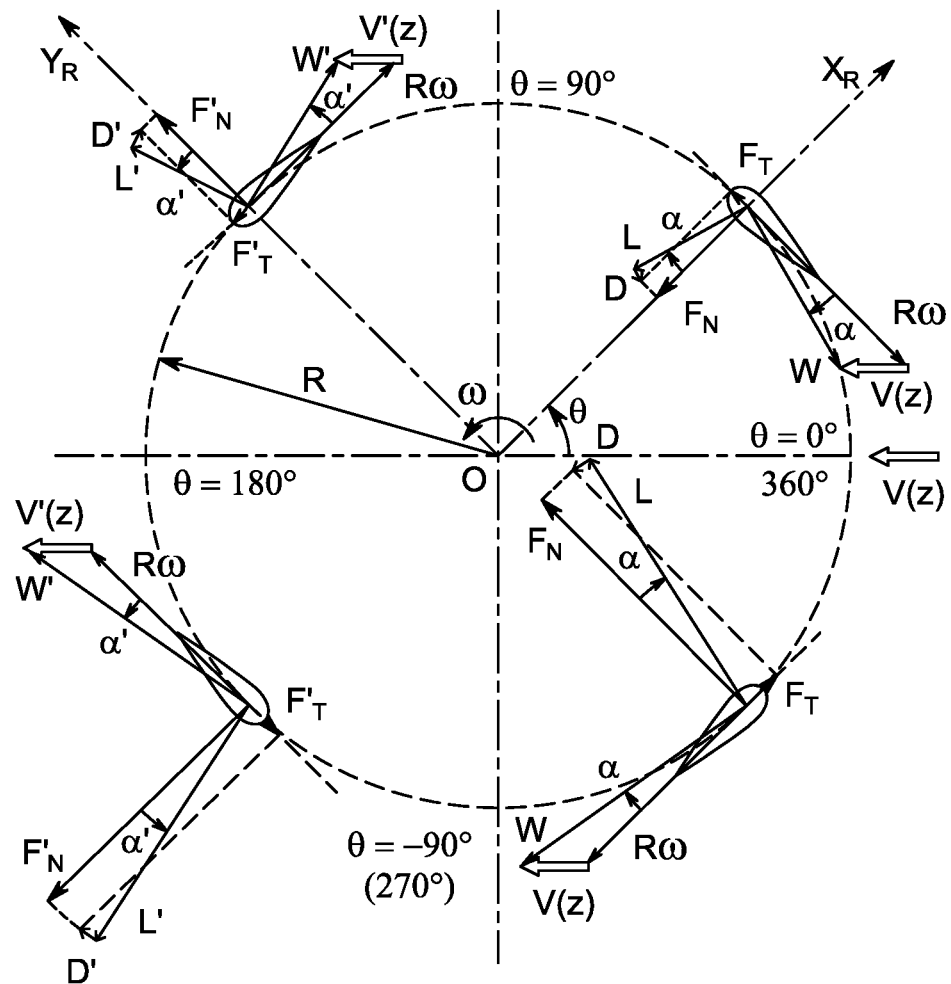

FIG. 2B is an overhead view of the VAWT rotor of FIG. 2A in the equatorial plane $(z=z_{EQ})$ to define further parameters related to embodiments of the invention. Primed indicators refer to the downwind cycle (where the blade is leeward of the turbine shaft (z-axis)) and non-primed indicators refer to the upwind cycle (where the blade is windward of the turbine shaft (z-axis)). In the figure, V(z) is the z-dependent wind velocity vector, $\omega$ is the turbine angular velocity, $\theta$ is the azimuthal angle, $\alpha$ is the rotor blade angle of attack, R$\omega$ is the rotor blade tangential velocity vector, W is the apparent wind velocity vector, $F_T$ is the tangential force vector, $F_N$ is the normal force vector, L is the lift force vector and D is the drag force vector. As illustrated, the wind is directed into the turbine at 0° azimuthal angle.

As the blades revolve about the rotor axis under the influence of the aerodynamic forces, they undergo a cyclic variation of pitch angle $\alpha$, defined as the relative angle between the tangential velocity vector R$\omega$ and the wind direction vector V. FIG. 2B shows a typical variation in the blade pitch angle $\alpha$ for different locations in terms of the azimuthal angle $\theta$ in the equatorial plane. The variation in the resultant velocity vectors W at four different azimuthal locations $\theta$ are also shown in terms of vector addition of the tangential velocity vectors R$\omega$ and the wind direction vectors V. The magnitude of the cyclic pitch variation is a direct function of the turbine rpm and the wind speed.

Figure 3A:
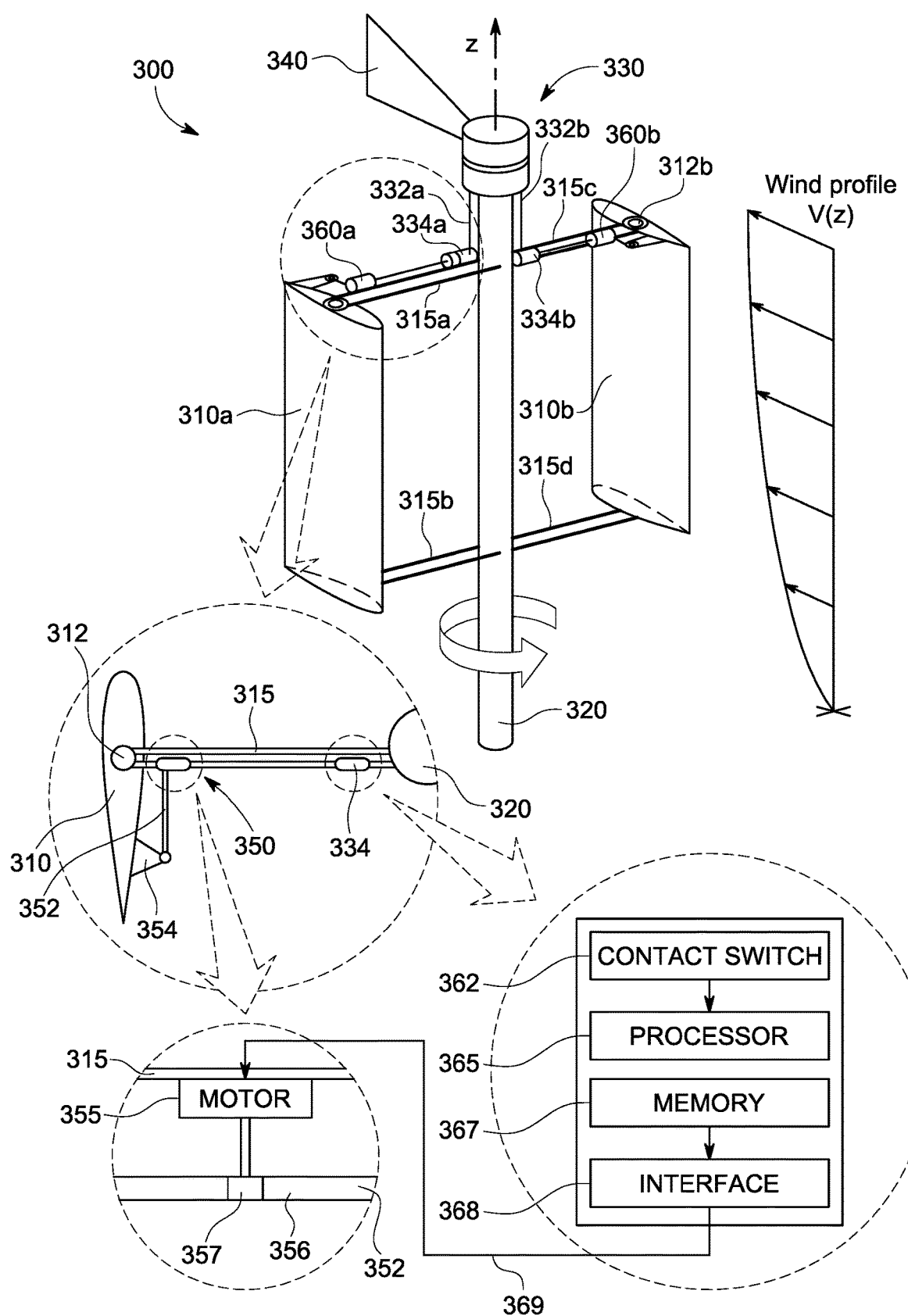
FIGS. 3A-3C are schematic diagrams of a vertical axis wind turbine by which the present invention can be embodied.

FIG. 3A is an illustration of an example VAWT rotor 300 by which the present invention can be embodied. Exemplary rotor 300 includes a plurality of rotor blades 310a and 310b, representatively referred to herein as rotor blade(s) 310, revolving about a rotor shaft 320. Exemplary rotor 300 further includes struts 315a-315d, representatively referred to herein as strut(s) 315 fixed at one end to shaft 320 and fixed at an opposing end to attachment points 312a and attachment points 312b, representatively referred to herein as attachment point(s) 312, of rotor blades 310. Attachment points 312 serve as the blade rotational axes and, in certain embodiments, are located quarter-chord from the blade leading edge It is to be noted that the center of pressure is not a good choice for attachment points because the center of pressure location is not fixed but changes with the blade pitch. A better location for attachment points adopted by embodiments of the present invention is at the aerodynamic center which is defined as the location where the blade moment is independent of the blade pitch. The aerodynamic center is located at the quarter-chord location for most blade profiles employing NACA profile sections. It is to be understood, however, that the invention is not limited to the quarter-chord attachment point discussed herein and can be practiced with blade profiles other than those standardized by NACA Unlike the fixed-bladed VAWT described above, rotor blades 310 are free to rotate about their blade axes located at attachment points 312. In the example illustrated, the blade axes are parallel to the axis defined by turbine shaft 320, although other blade configurations are possible.

Exemplary VAWT rotor 300 includes a sensor 330 by which wind direction and rotor angular velocity (which is dependent on wind velocity) are determined. To that end, exemplary sensor 330 comprises a wind vane 340, contact wires 332a and 332b, representatively referred to herein as contact wire(s) 332, and controllers 334a and 334b, representatively referred to herein as controller(s) 334. As rotor 300 rotates about its axis, contact wires 332 come into contact with controllers 334 and, responsive thereto, a signal is generated, which may be used to control respective actuators 350a and 350b, representatively referred to herein as actuator(s) 360. Actuators 360 are mechanically coupled to respective rotor blades 310 at attachment points 354 through suitable linkages 352 that compel the corresponding rotor blade 310 to rotate about its blade axis 312.

As illustrated in FIG. 3A, actuator 350 may be implemented by a motor 355 mechanically affixed to strut 315 by suitable connection hardware. Motor 355 may include a gear 356 that engages with a gear portion 356 of linkage 352. Motor 355 may be a stepper or servo motor and may provide the necessary torque to motivate blade 310 about its blade axis and to retain blade 310 in position against the aerodynamic forces imparted thereon. However, it is to be understood that the motor arrangement of FIG. 3A is but one example of an actuator that can be used in embodiments of the invention. Other actuator implementations, including pneumatic or hydraulic implementations, can be realized in embodiments of the invention without departing from the spirit and intended scope thereof.

Figure 3B:
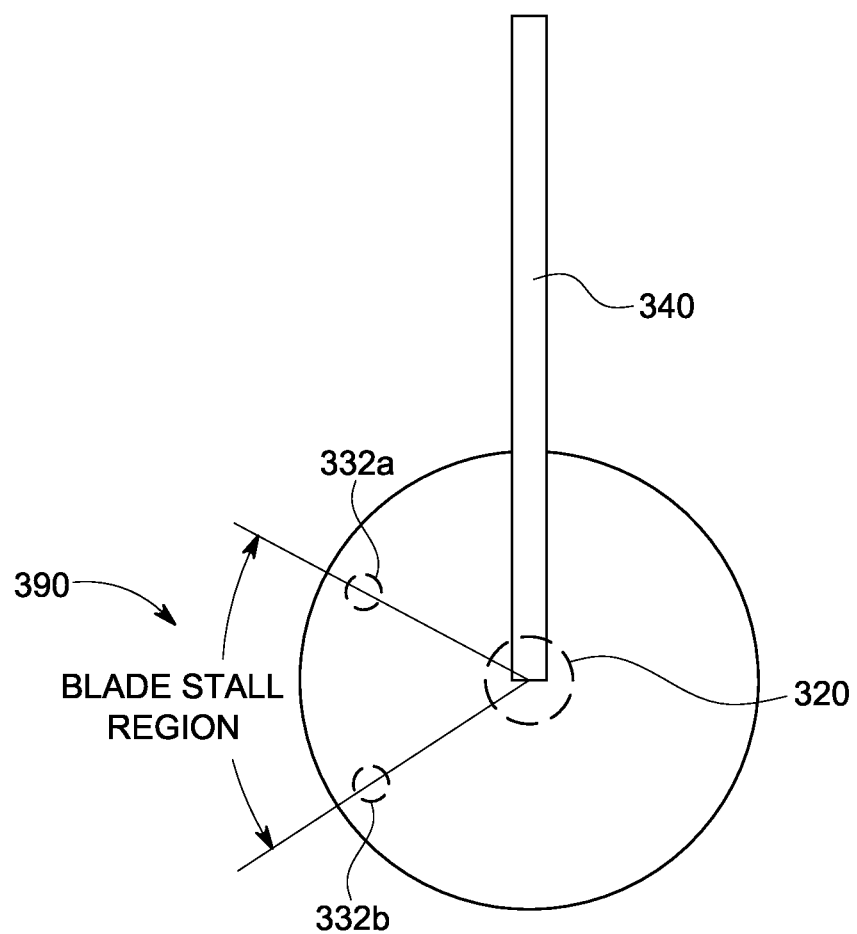

FIG. 3B is a diagram illustrating an example sensor mechanism that can be incorporated in embodiments of the present invention. As illustrated in the figure, contact wires 332 are attached to wind vane 340 at locations defining a stall region 390. The location of the stall regions are determined from analysis of forces described with reference to FIG. 2A-2B. The position of wind vane 340 provides the wind direction; thus, the position of contact wires 332 depends only on wind direction. As shaft 320 rotates, actuators 350 pass under wind vane 340 and make contact with contact wires 332. The rate at which such contact occurs as the rotor rotates can be used to determine the turbine angular velocity ω.

Figure 3C:
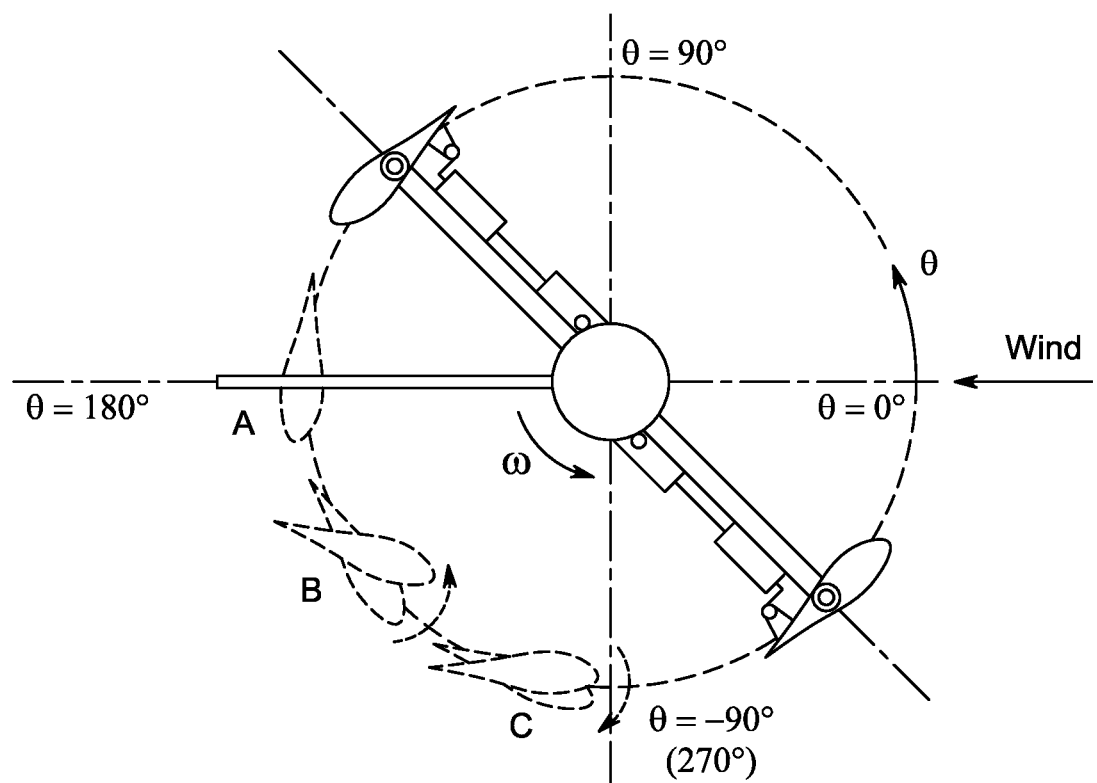

FIG. 3C is an overhead view of VAWT rotor 300 illustrating an example pitch actuation sequence. At point A, the wind vane location is sensed to serve as a reference and the angular velocity of the shaft is sensed. At point B, the pitch actuation is initiated based on a programmed increment from the reference point (wind vane location). After another programmed increment in azimuthal angle θ, i.e., point C, the blade pitch is reset back to its initial value. Contact wires 332 may be positioned on wind vane 340 to effectuate this sequence. Because the stall locations depend only on the wind direction, the contact wire activation/deactivation may be fixed. As the rpm changes, the activation amplitude and frequency can be changed to correspond to the rpm. This may be pre-programmed in the sensor that activates the servo or stepper motor.

Referring once again to FIG. 3A, controller 334 may include a contact switch 362 that indicates contact with contact wires 332, such as by sensing the pressure of contact wire 332 thereon. Contact switch 362 may provide an indication of the contact to a processor 365, which may execute programmed instructions stored in memory 367. Processor 365 may be so programmed to realize a controller that controls actuator 350 based on the azimuthal angles θ of stall region 390 and rotor angular velocity ω determined by sensor 330. e.g., by location of contact wires 332 on wind vane 340 (to define the stall region based on wind direction) and the rate at which contact wires 332 make contact with controller 334 (to establish rotor angular velocity ω). Processor 365 may determine the amount of rotor rotation from the turbine angular velocity ω. An interface 368 may be provided to convert processor level signals to a motor drive signal 369 that compels motor 355 to rotate an amount specified by processor 365.

In FIGS. 3A-3C, processor 365, memory 367 and interface 368 are illustrated as residing in the same housing as contact switch 362. However, the present invention is not so limited. Indeed, in certain embodiments, these components are contained in the same housing as motor 355. The distribution of components is left to the designer.

Figure 4:
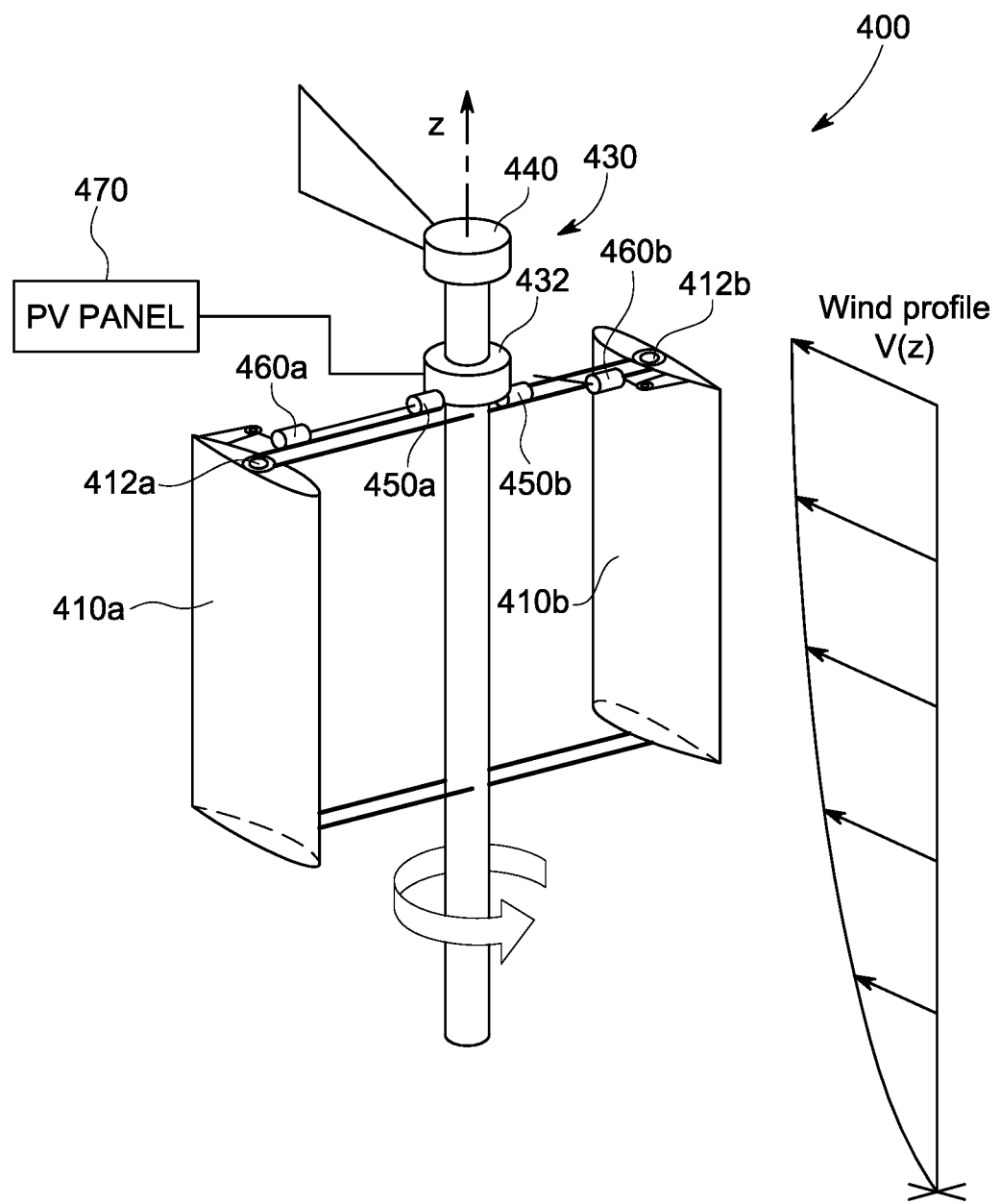
FIG. 4 is a schematic diagram of a vertical axis wind turbine by which the present invention can be embodied.

FIG. 4 is a diagram illustrating an example VAWT rotor 400 by which the present invention can be embodied. Rotor 400 is similar in construction to rotor 300 and, thus, rotor 400 includes a plurality of rotor blades 410a and 410b, representatively referred to herein as rotor blade(s) 410, revolving about a turbine shaft 420 and fixed thereto by struts 415a-415d, representatively referred to herein as strut(s) 415. Rotor blades 410 are free to rotate about respective blade axes located at attachment points 412a and 412b, representatively referred to as attachment points 412. The blade axes may be parallel to the axis defined by turbine shaft 420, but, again, the present invention is not so limited.

Exemplary VAWT rotor 400 includes controllers 450a and 450b, representatively referred to herein as controller(s) 450, that control respective actuators 460a and 460b, representatively referred to herein as actuator(s) 460. As with VAWT rotor 300, actuators 460 are mechanically coupled to respective rotor blades 410 through suitable linkages that compel the corresponding rotor blade 410 to rotate about its blade axis under control of the corresponding controller 450 as the rotor blade 410 revolves about the rotor axis defined by turbine shaft 420. VAWT turbine 400 may utilize any of the actuator implementations discussed herein.

Exemplary VAWT rotor 400 includes a sensor 430 by which the wind direction and turbine angular velocity ω can be ascertained. Sensor 430 may include a wind vane 440 by which the wind direction is determined and a rotary encoder indicates the relative wind direction. Another rotary encoder 432 can determine both the angular velocity of shaft 420 and its azimuthal angle relative to some reference angle. Absolute and incremental rotary encoders may be used in embodiments of the invention. In one embodiment, rotary encoder 432 is attached to a fixed point on the turbine, such as on a mast (not illustrated) and to the turbine shaft 420. A battery or photovoltaic power source 470 may be used to provide power to rotary encoder 432.

Figure 5:
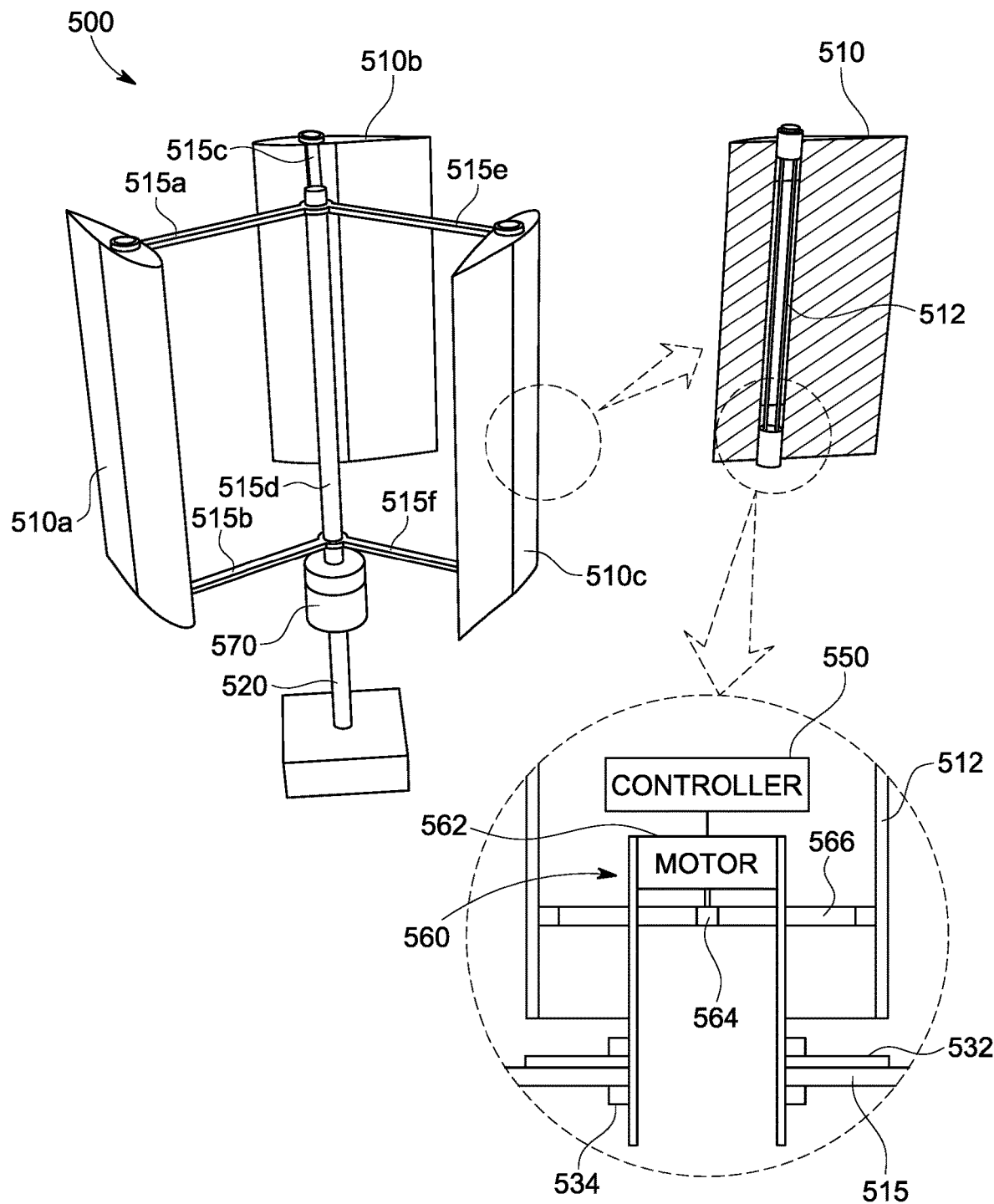
FIG. 5 is a schematic diagram of a vertical axis wind turbine by which the present invention can be embodied.

FIG. 5 is a diagram illustrating an example VAWT rotor 500 by which the present invention can be embodied. VAWT rotor 500 includes a shaft 520 to which are connected a plurality of rotor blades 510a-510c, representatively referred to herein as rotor blade(s) 510. Rotor blades 510 may be connected to shaft 520 through struts 515a-515f, representatively referred to herein as strut(s) 515. Each rotor blade 510 has internally installed a housing 512, which may be tubular, that contains a controller 550 and an actuator 560. Housing 512 and turbine blade 510 are mechanically coupled such that activation of actuator 560 results in rotation of rotor blade 510 about an axis. Housing 512 may be mechanically connected to struts 515 to be rotated by actuator 560 under control of controller 550. In the illustrated embodiment, actuator 560 includes a motor 562 moving a gear 564. Gear 564 may be engaged to a gear 566, such that actuation of motor 562 causes turbine blade 510 to rotate about its connection point with strut 515. In one embodiment, each turbine blade 510 has a mounting flange 532 or similar structure that may be fixedly attached to strut 515 with suitable hardware, such as bolts 534. Such could keep motor stationary to apply sufficient torque to turbine blade 510 to hold it steady against the torque applied by aerodynamic forces.

Figure 6:
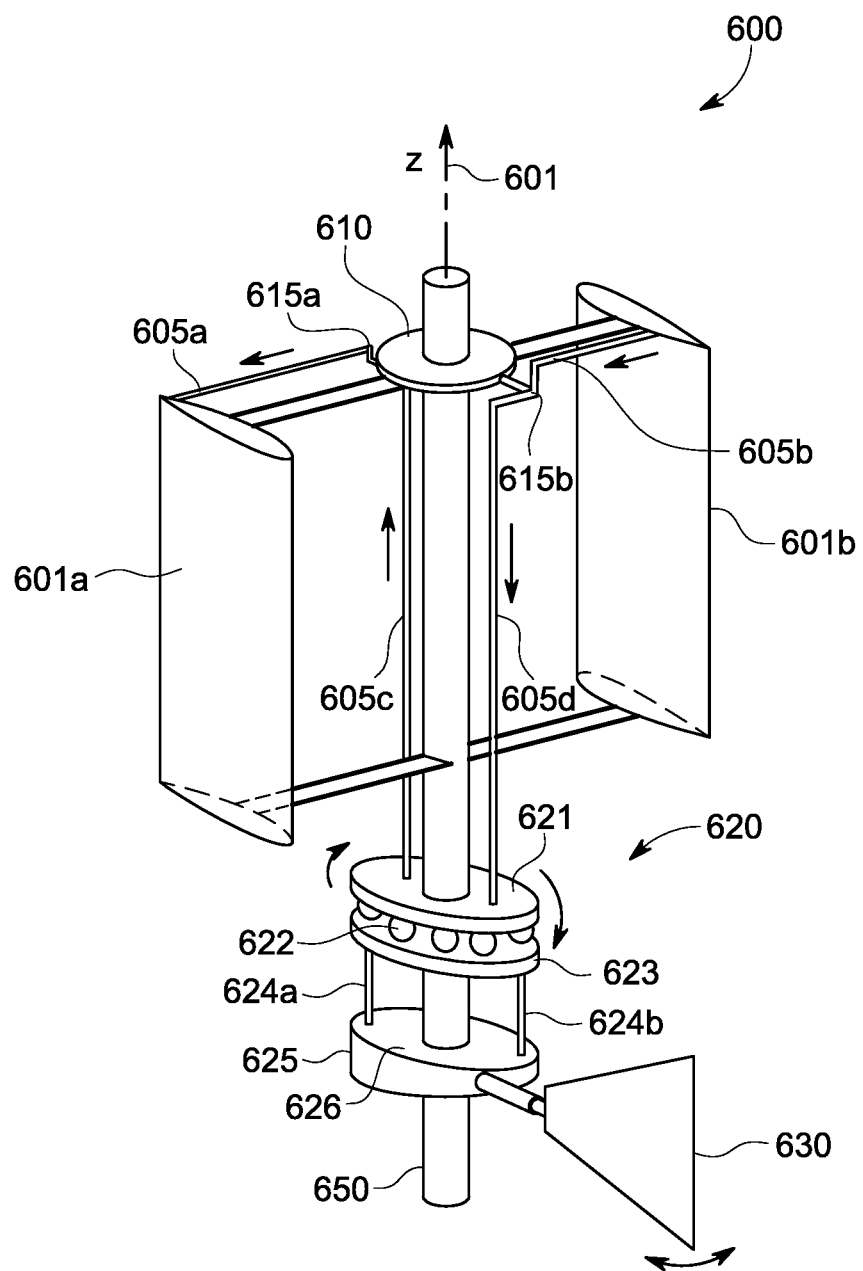
FIG. 6 is a schematic diagram of another vertical axis wind turbine by which the present invention can be embodied.

FIG. 6 is a diagram illustrating an example VAWT rotor 600 by which the present invention can be embodied. In this example, blades 601a-601b, representatively referred to herein as blade(s) 601, are mechanically coupled to shaft 650 to revolve about an axis 601 defined by the center of shaft 650. Blade pitch link rods 605a-605d, representatively referred to herein as blade pitch link rod(s) 605, are activated by the tilt of the upper portion 621 of even swashplate 620 that rotates with the blades 601 and shaft 650. Its lower part 623 below the bearings 622 is connected to the uneven or tilted swashplate 625 via input link rods 624a-624b, representatively referred to herein as input link rod(s) 624. A wind vane 630 is also connected to the uneven or tilted swashplate 625. The wind vane 630, the uneven or tilted swashplate 625, the input link rods 624 and the lower part 623 of the even swashplate 620 rotate together as one part about shaft 650 and align according to the wind direction independently from the blades 601, shaft 650 and the upper portion 621 of even swashplate 623. The uneven height or the tilt of the uneven or tilted swashplate 625 is predetermined according to the design and prebuilt into the mechanism by an incline 626. The input link rods 624 of equal length connected to the lower part 623 of even swashplate 620 causes the even swashplate 620 to have the same tilt as the incline 626 of uneven swashplate 625. Since the blade pitch link rods 605 are attached to hinges 615a-615b, representatively referred to herein as hinge(s) 615, that are fixed to the upper strut-shaft collar 610, the tilt of the swashplate pushes the blade link rods 605 up or down as it rotates. This push and pull of the blade pitch link rods 605 results in an increase or decrease in the blade pitch according to a predetermined and preset amount thus achieving a passively controlled variable pitch action.

As indicated above, embodiments of the invention enhance turbine performance by preventing the rotor blades from undergoing stall by actively modifying the pitch angle of the blades as they enter the stall regions. In certain embodiments, a local pitch change $\Delta\alpha_e$ is added to the local pitch angle $\alpha$ to realize a local effective pitch angle $\alpha_e=\alpha+\Delta\alpha_e$. The curve defined by the local effective pitch angle over the 360° azimuthal angles $\theta$ is referred to herein as a pitch angle profile.

Figure 7A:
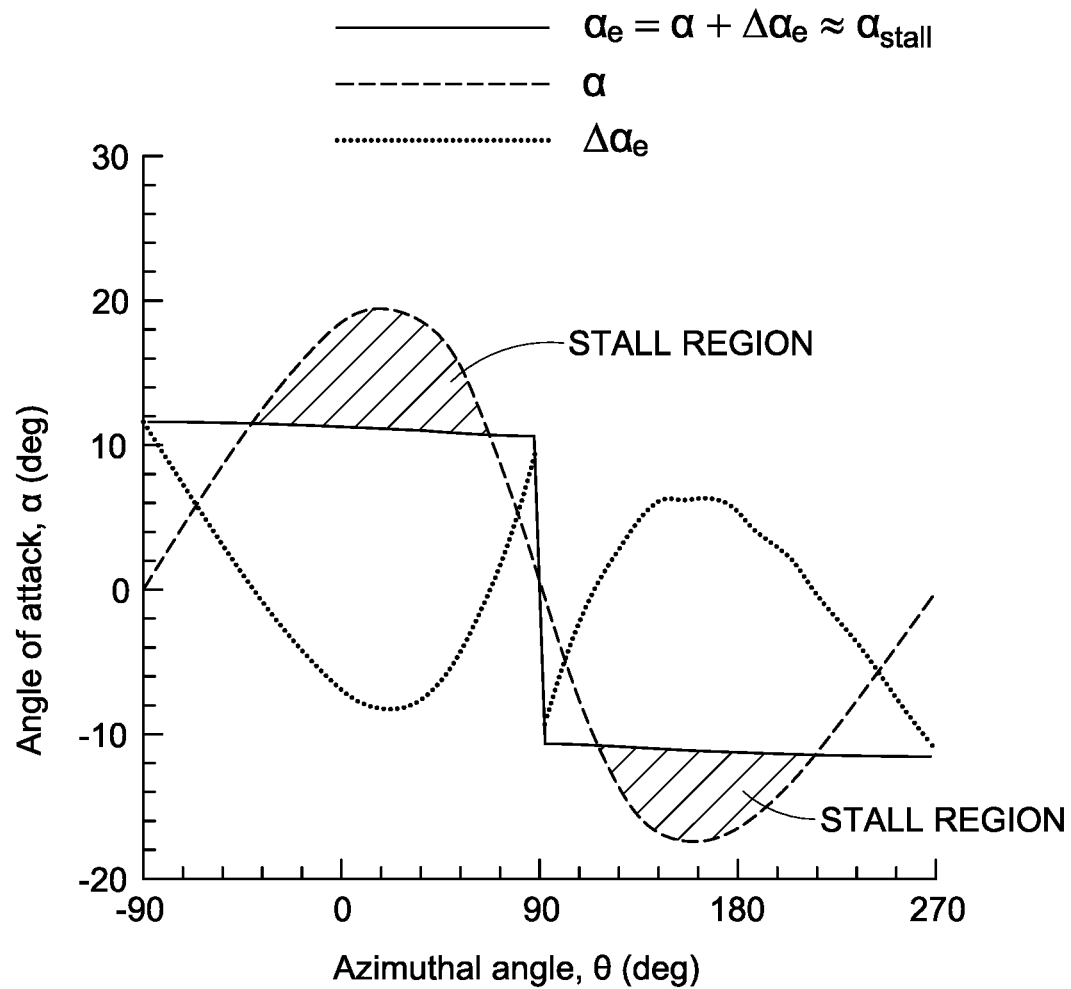
FIG. 7A is a graph depicting a blade pitch profile with which the present invention can be embodied.
Figure 7B:
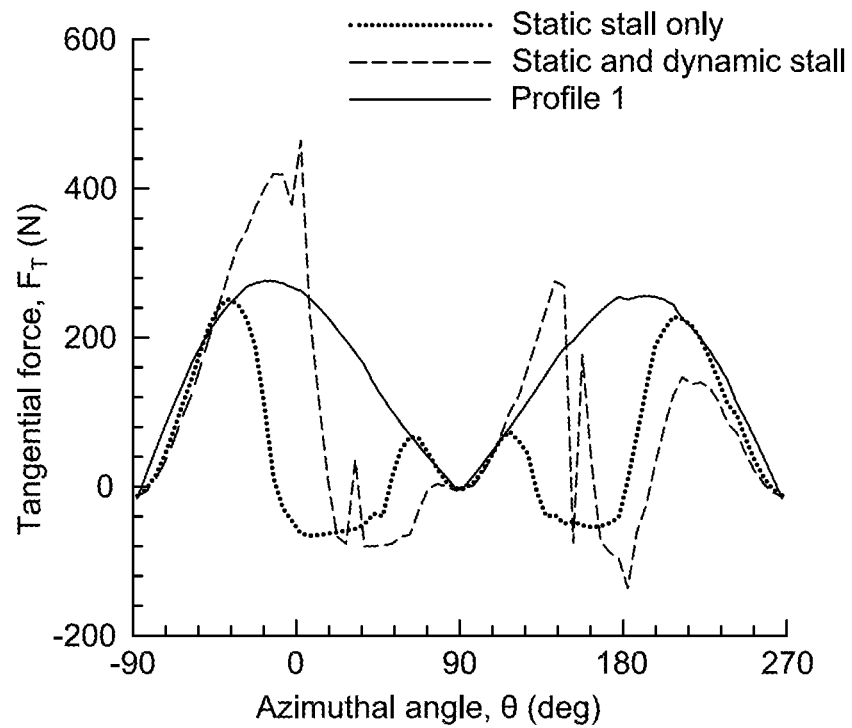
FIGS. 7B-7C are graphs depicting tangential force and torque, respectively, of a vertical axis wind turbine operating under the blade pitch profile of FIG. 7A.
Figure 7C:
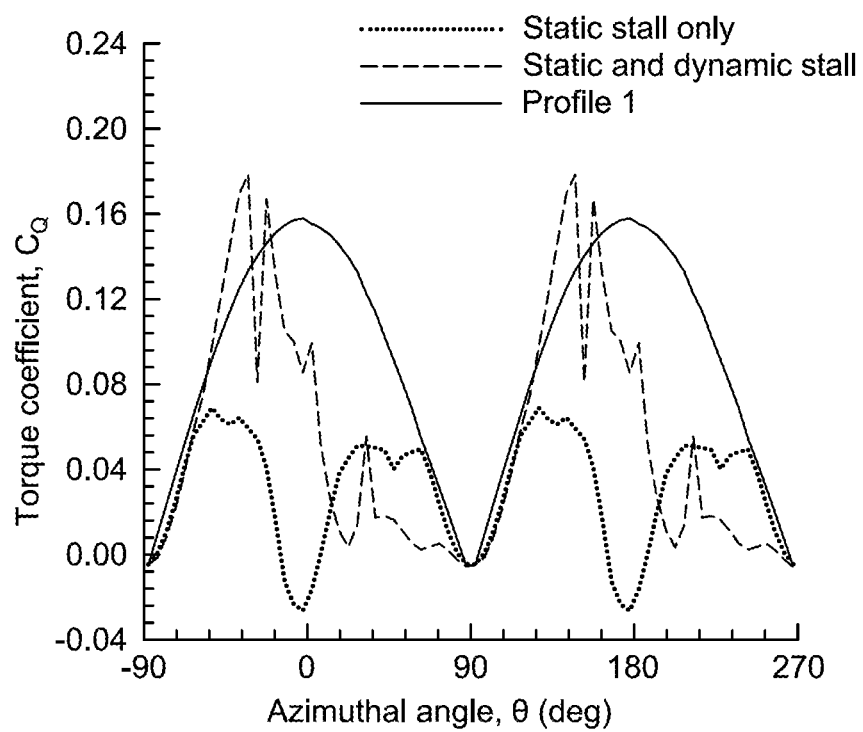

FIG. 7A is a graph illustrating a pitch angle profile, referred to herein as pitch angle profile 1, of one embodiment of the present invention. Here, the local rotor blade angle of attack $\alpha$ is kept just below the local stall angle at all points along the revolution cycle, i.e., for every azimuthal angle $\theta$. Essentially, the local geometric blade angle of attack $\alpha$ is increased/decreased by $\Delta\alpha_e$ to the local static stall angle value and as such the blade never experiences stall since it avoids the stall region altogether. FIG. 7B is a graph illustrating the tangential force under the pitch angle profile 1 and FIG. 7C is a graph illustrating torque under pitch angle profile 1.

Figure 8A:
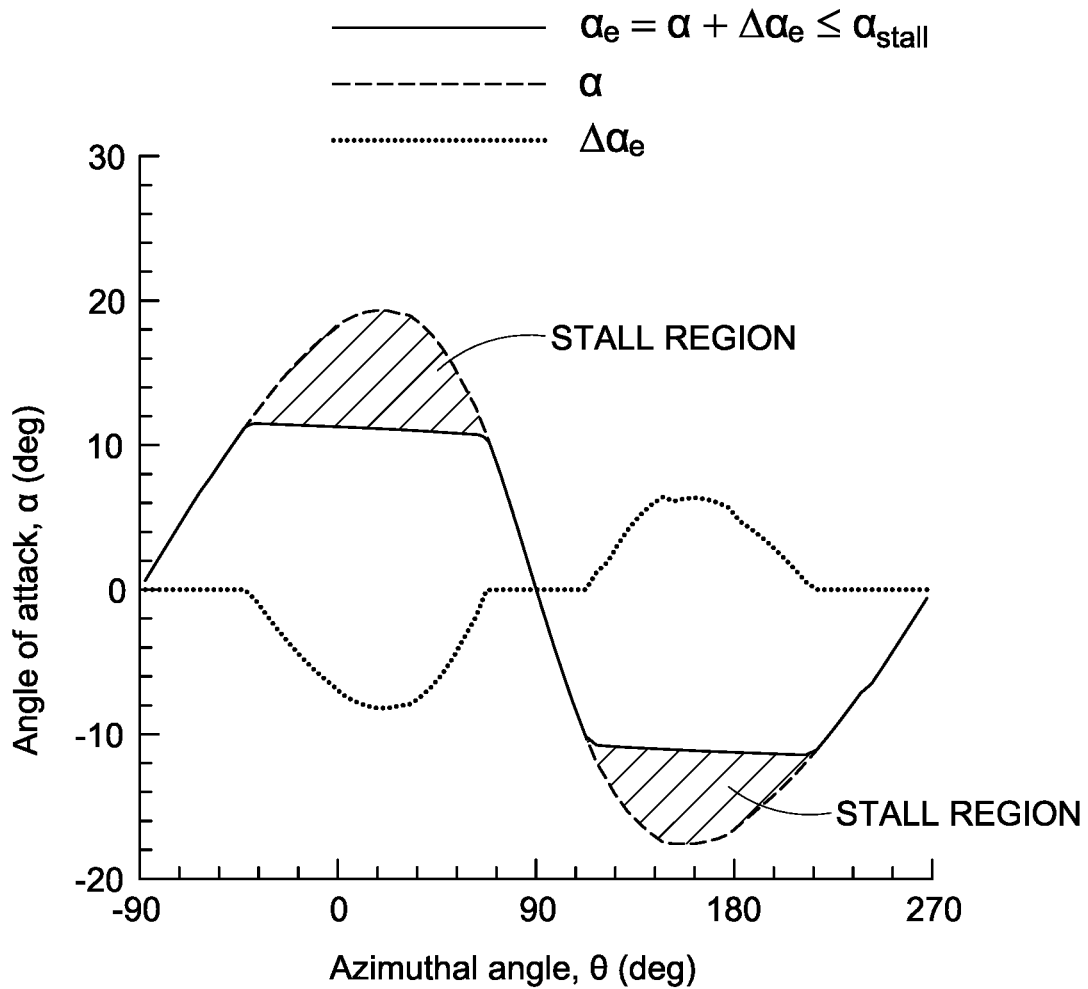
FIG. 8A is a graph depicting another blade pitch profile with which the present invention can be embodied.
Figure 8B:
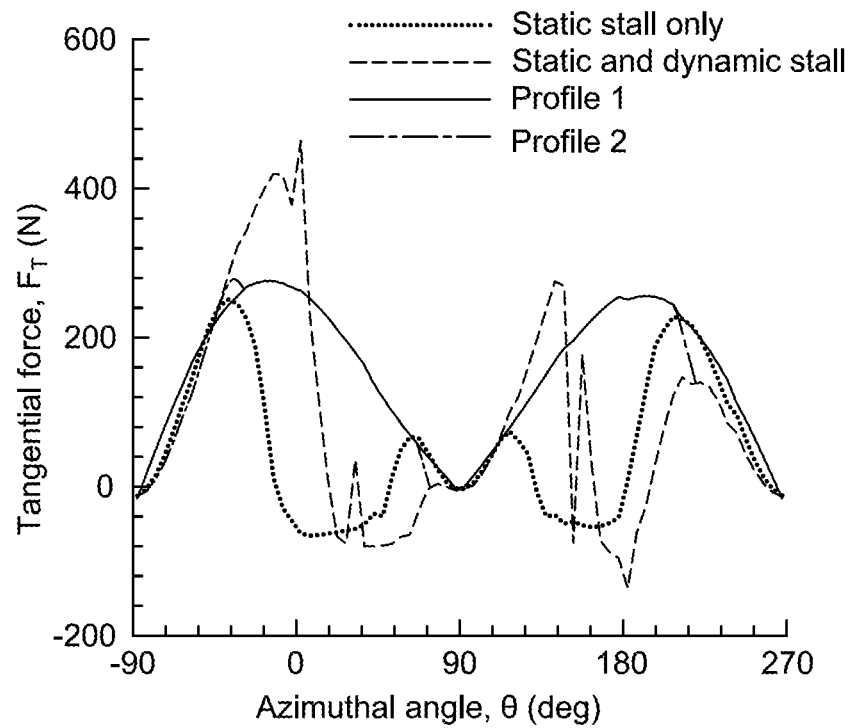
FIGS. 8B-8C are graphs depicting tangential force and torque, respectively, of a vertical axis wind turbine operating under the blade pitch profile of FIG. 7A.
Figure 8C:
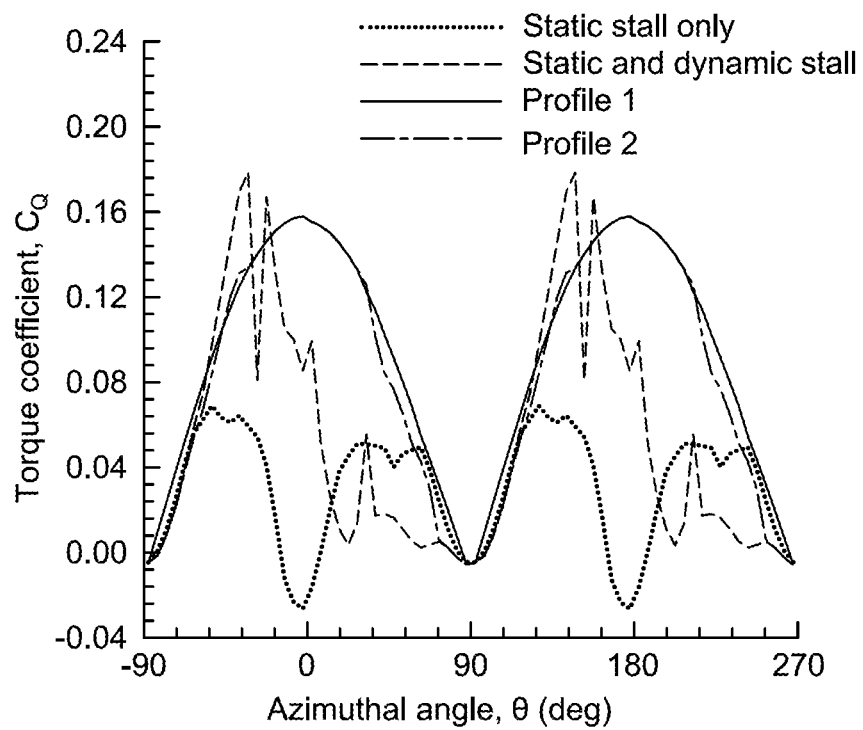

FIG. 8A is a graph illustrating another pitch angle profile, referred to herein as pitch angle profile 2, of an embodiment of the present invention Here, the local effective angle of attack $\alpha_e$ is kept at the blade stall angle during the revolution cycle only when the geometric angle of attack exceeds the static stall angle value $\alpha_{stall}$. As illustrated in FIGS. 8B and 8C, the tangential force and torque undergo a more gradual change or smoother transition at $\theta=-\pi/2$ and $\pi/2$ than in the blade pitch angle profile 1 case.

Figure 9A:
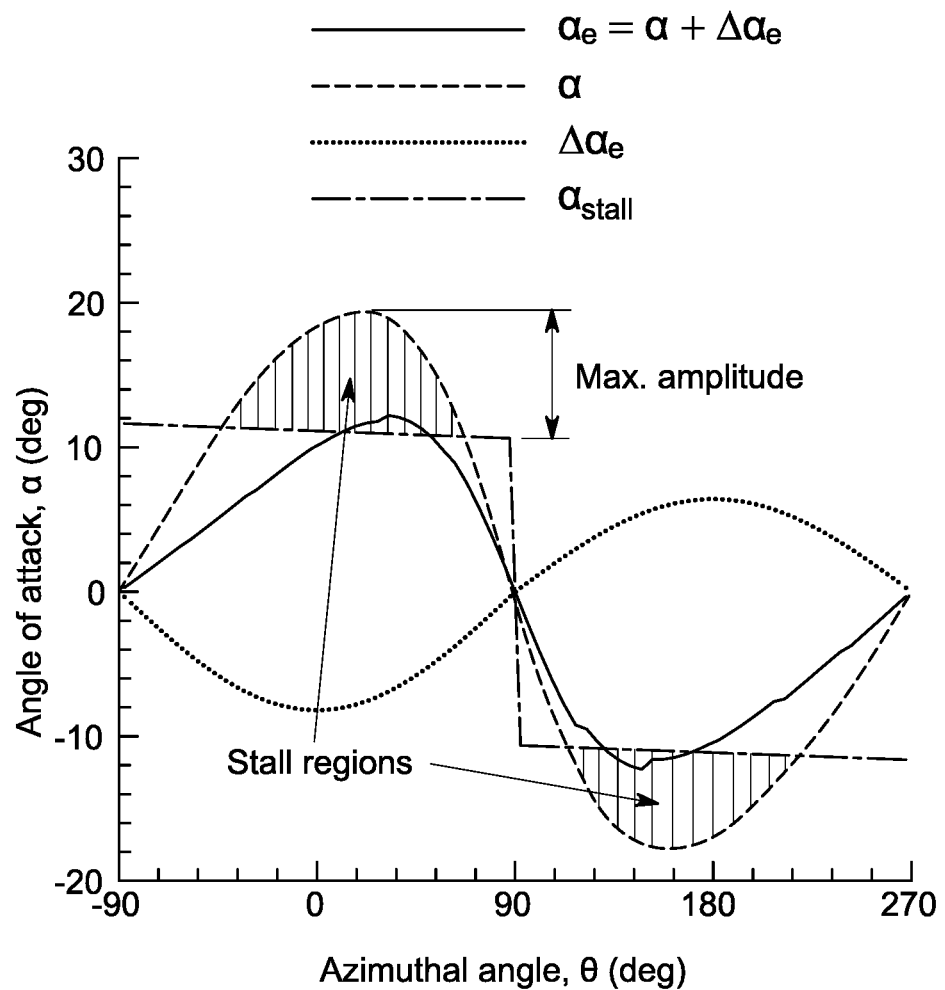
FIG. 9A is a graph depicting another blade pitch profile with which the present invention can be embodied.
Figure 9B:
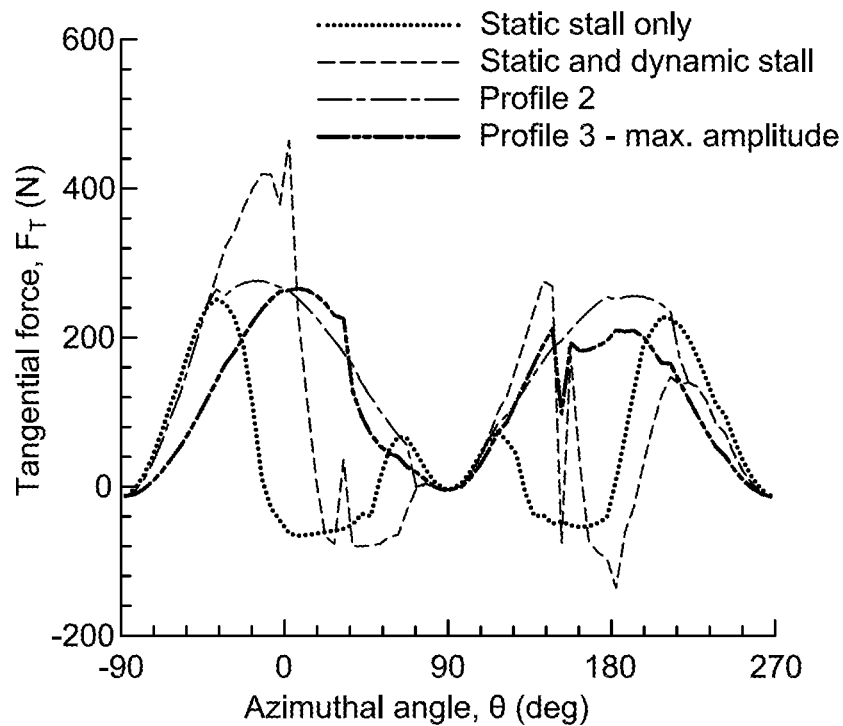
FIGS. 9B-9C are graphs depicting tangential force and torque, respectively, of a vertical axis wind turbine operating under the blade pitch profile of FIG. 8A.
Figure 9C:
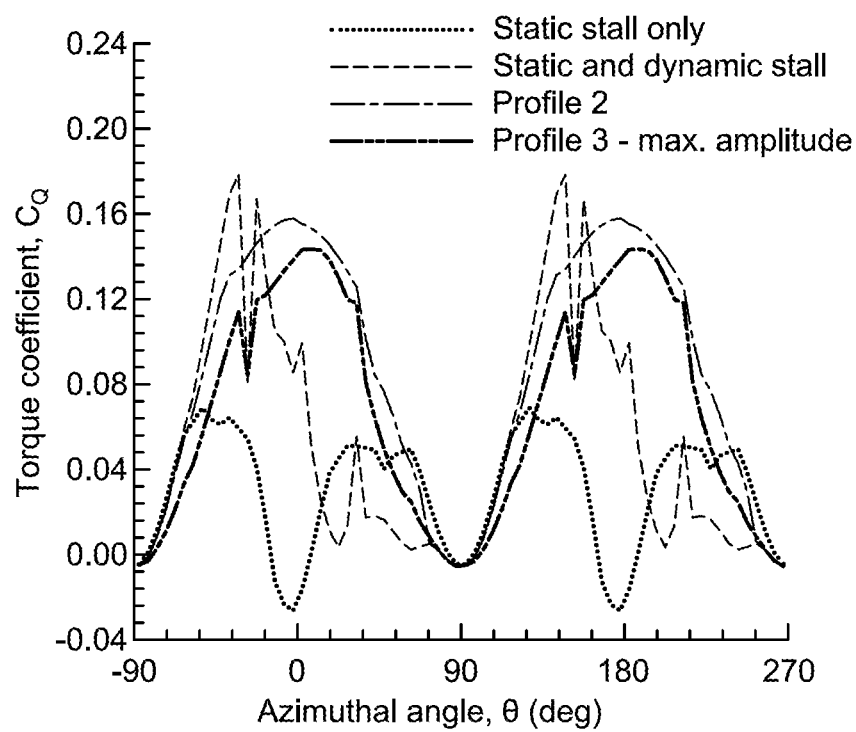

FIG. 9A is a graph illustrating another pitch angle profile, referred to herein as pitch angle profile 3, of an embodiment of the present invention Here, the evolution of the local angle of attack correction $\Delta\alpha_e$ is implemented in a smooth continuous function such as a sinusoid. The maximum amplitude of the sinusoidal correction function is set equal to the maximum difference between the local geometric angle of attack $\alpha$ and the blade static stall angle $\alpha_{stall}$. As a consequence, the local effective angle of attack $\alpha_e$ is also sinusoidal. In this embodiment, the blade experiences dynamic stall at a few locations during the revolution cycle, which can be avoided by decreasing the maximum value of the correction function until the dynamic stall condition is avoided altogether yielding a smooth and continuous variation in tangential and normal forces and torque. A smooth and continuous correction function $\Delta\alpha_e$ is more practical to implement. FIGS. 9B and 9C illustrate the tangential force and torque curves, respectively, under pitch angle profile 3.

Figure 10:
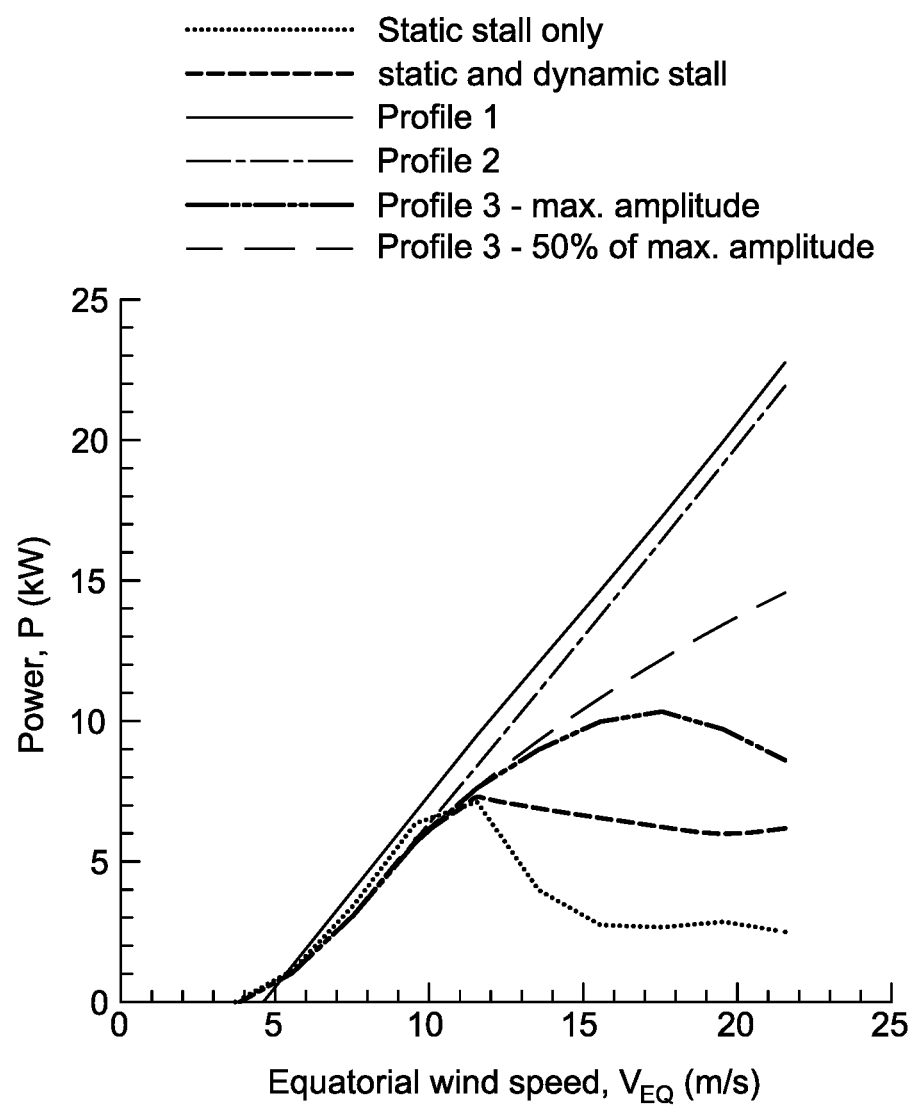
FIG. 10 is a graph of output power of a vertical axis wind turbine operating under different blade pitch profiles.

FIG. 10 is a graph illustrating output power of the VAWT rotor as a function of wind velocity under the different blade pitch profiles described above. As is illustrated, power output of these embodiments increases linearly with wind speed. Moreover, the increase in power output at high wind speeds is significantly higher than the case where static or dynamic stall or both are encountered by the blade.

Figure 11:
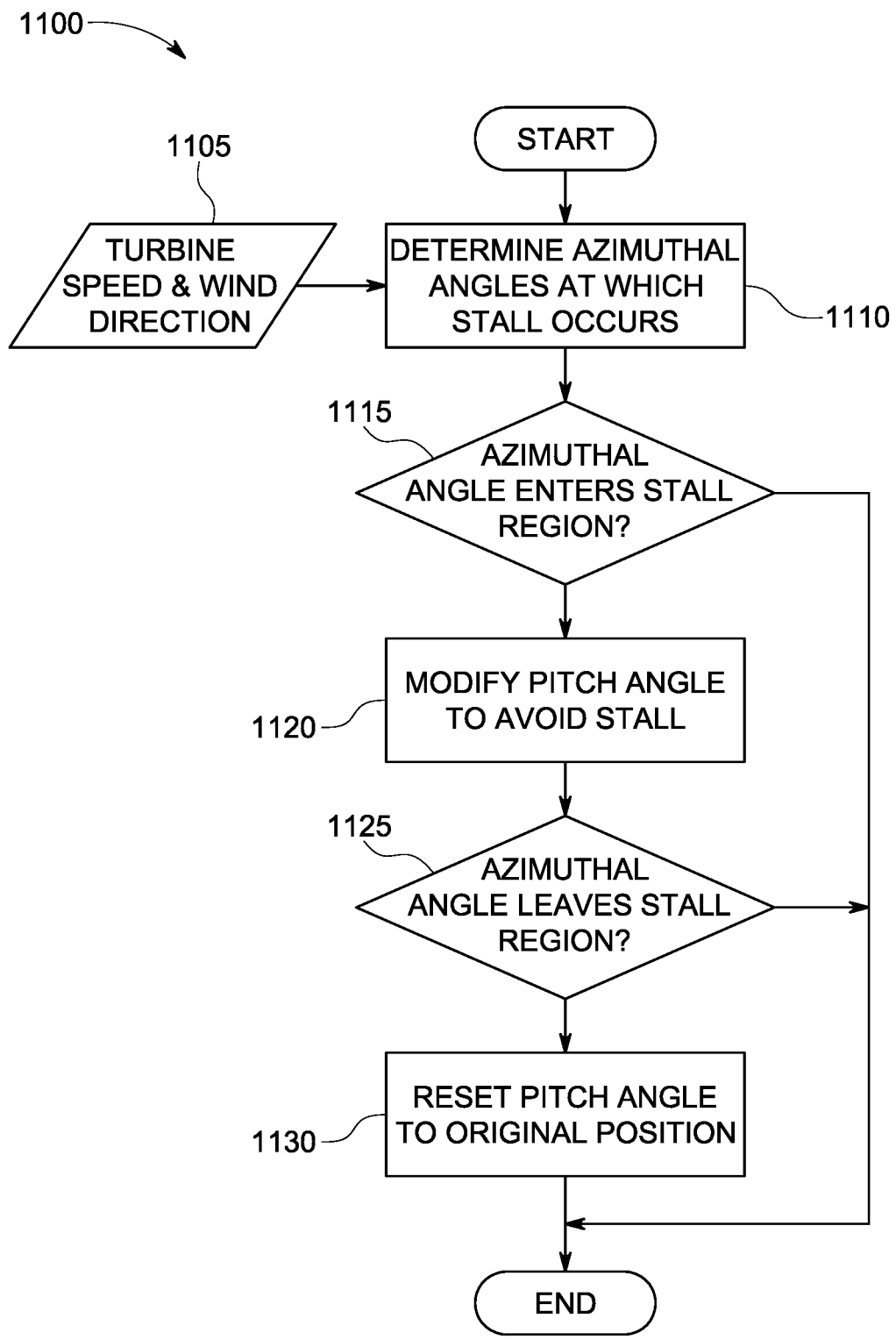
FIG. 11 is a flow diagram of a turbine blade control process by which the present invention can be embodied.

FIG. 11 is a flow diagram of an example turbine blade control process 1100 by which the present invention can be embodied. As indicated at block 1105, process 1100 is provided with turbine speed and wind direction data, such as by the techniques described above. In operation 1110, azimuthal angles are determined at which stall occurs by a turbine blade. In operation 1115, it is determined whether the turbine blade at a particular azimuthal angle enters a stall region. If so, process 1100 transitions to operation 1120, by which the pitch angle of the turbine blade is modified to avoid stall, In certain embodiments, the pitch angle is modified in accordance with a pitch angle profile, such as those described above. In operation 1125, it is determined whether the turbine blade at a particular azimuthal angle is leaving the stall region. If so, process 1100 transitions to operation 1130, whereby the pitch angle of the turbine blade is reset to its original position.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

The invention claimed is:

1. A vertical axis wind turbine having a vertical rotor apparatus,
    wherein a shaft of the vertical rotor apparatus rotates in response to wind,
    wherein the shaft is configured to transfer mechanical energy from the vertical rotor apparatus to a generator, and
    wherein the vertical rotor apparatus comprises:
        a rotor having an axis of rotor rotation defined by the shaft;
        a plurality of rotor blades longitudinally aligned in parallel with the shaft, each rotor blade defining an axis of blade rotation, wherein each rotor blade is attached to the shaft by an upper strut attached to an upper end of the rotor blade through an upper attachment point and a lower strut attached to a lower end of the rotor blade through a lower attachment point, the upper and lower attachments points defining an axis of rotor blade rotation;
        a sensor to determine whether any of the rotor blades are within rotor azimuthal angles of blade stall regions, wherein the sensor comprises:
            a fluid vane configured to indicate wind direction;
            contact wires connected to the fluid vane and displaced with rotation thereof, the contact wires defining the blade stall regions as a function of the wind direction; and
            a contact sensor, responsive to pressure, mounted proximally to the shaft and moving through azimuthal angles therewith, the contact sensor generating a signal in response to contacting the contact wires;
        a controller to provide blade pitch information for the blade stall regions; and
        an actuator mechanically coupled to each of the rotor blades to alter blade pitch about the respective axis of rotor blade rotation in accordance with the blade pitch information so as to avoid blade stall for all rotor azimuthal angles.

2. The vertical axis wind turbine of claim 1, wherein the contact sensor is mounted on the upper struts.

3. The vertical axis wind turbine of claim 2, wherein the actuator is mounted on the upper struts.

4. The vertical axis wind turbine of claim 1, wherein the sensor further comprises a rotary encoder.

5. The vertical axis wind turbine of claim 4, further comprising a photovoltaic power source to provide power to the rotary encoder.

6. The vertical axis wind turbine of claim 1, wherein the blade pitch information includes a blade pitch profile, and the blade pitch profile is constant at a predetermined blade pitch for all azimuthal angles.

7. The vertical axis wind turbine of claim 1, wherein the blade pitch information includes a blade pitch profile, and the blade pitch profile is a sinusoid.

8. The vertical axis wind turbine of claim 1, wherein the actuator is internal to each of the rotor blades and rotates the corresponding blade about the respective axis of rotor blade rotation.

* * * * *